US007796287B2

(12) United States Patent
Fukuta

(10) Patent No.: US 7,796,287 B2
(45) Date of Patent: Sep. 14, 2010

(54) IMAGE PROCESSING SYSTEM, IMAGE PROCESSING DEVICE, AND AUDIT DATA TRANSFER MODE

(75) Inventor: Shigenori Fukuta, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1232 days.

(21) Appl. No.: 11/342,648

(22) Filed: Jan. 31, 2006

(65) Prior Publication Data
US 2006/0184543 A1 Aug. 17, 2006

(30) Foreign Application Priority Data
Feb. 4, 2005 (JP) ............... 2005-029656

(51) Int. Cl.
G06F 3/12 (2006.01)

(52) U.S. Cl. ............ 358/1.15; 358/1.16; 358/403; 358/404; 707/999.01

(58) Field of Classification Search ........ None
See application file for complete search history.

(56) References Cited

U.S. PATENT DOCUMENTS

| 5,579,126 | A  | * | 11/1996 | Otsuka ............... 358/403 |
| 5,687,302 | A  | * | 11/1997 | Kawase ............... 358/1.16 |
| 5,913,039 | A  | * | 6/1999  | Nakamura et al. ...... 709/231 |
| 6,002,845 | A  |   | 12/1999 | Honma ............... 395/115 |
| 6,185,009 | B1 | * | 2/2001  | Yamazaki et al. ....... 358/404 |
| 6,400,465 | B1 | * | 6/2002  | Nishiyama et al. ...... 358/1.16 |
| 6,567,180 | B1 | * | 5/2003  | Kageyama et al. ...... 358/1.15 |
| 6,592,629 | B1 | * | 7/2003  | Cullen et al. .......... 715/205 |
| 6,636,953 | B2 | * | 10/2003 | Yuasa et al. ........... 711/161 |
| 6,668,134 | B1 | * | 12/2003 | Niikawa ............... 386/95 |
| 6,704,118 | B1 | * | 3/2004  | Hull et al. ............ 358/1.15 |
| 6,862,101 | B1 | * | 3/2005  | Miyazaki et al. ....... 358/1.13 |
| 6,985,245 | B1 | * | 1/2006  | Takahashi ............ 358/1.15 |
| 7,080,099 | B2 | * | 7/2006  | Tada et al. ............ 707/104.1 |
| 7,268,908 | B2 | * | 9/2007  | Yamagishi ............ 358/1.15 |
| 7,379,196 | B2 | * | 5/2008  | Ohara ................. 358/1.13 |
| 7,480,069 | B2 | * | 1/2009  | Yoshida et al. ........ 358/1.16 |
| 7,557,947 | B2 | * | 7/2009  | Nakata et al. ......... 358/1.15 |
| 7,561,291 | B2 | * | 7/2009  | Horiyama ............. 358/1.15 |
| 2002/0015166 | A1 | * | 2/2002 | Wakai et al. .......... 358/1.11 |
| 2002/0075520 | A1 | * | 6/2002 | Adegawa .............. 358/402 |
| 2003/0011800 | A1 |   | 1/2003 | Miyahara et al. ....... 358/1.13 |
| 2003/0084105 | A1 | * | 5/2003 | Wiley et al. ........... 709/205 |
| 2005/0024666 | A1 | * | 2/2005 | Ohyama et al. ........ 358/1.13 |

(Continued)

FOREIGN PATENT DOCUMENTS

JP 6-270477 9/1994

(Continued)

Primary Examiner—Mark K Zimmerman
Assistant Examiner—Dung D Tran
(74) Attorney, Agent, or Firm—Fitzpatrick, Cella, Harper & Scinto

(57) ABSTRACT

In an image processing system which is configured by providing an image processing device for executing an image process to input image data and a server device, the image processing device comprises a storage unit to store audit data including the input image data and history information generated in association with execution of the image process to the image data, and the server device acquires the audit data stored in the storage unit and stores the acquired audit data. Then, in the case where the image process is executed by the image processing device, the acquisition of the audit data by the acquisition unit is inhibited.

9 Claims, 12 Drawing Sheets

U.S. PATENT DOCUMENTS

2005/0071495 A1* 3/2005 Kadota ................. 709/232
2006/0103872 A1* 5/2006 Shimogori ............. 358/1.15

FOREIGN PATENT DOCUMENTS

| JP | A 07-203108 | 8/1995 |
| JP | A 10-224536 | 8/1998 |
| JP | 10-294844 | 11/1998 |
| JP | A 11-232058 | 8/1999 |
| JP | A 11-341212 | 12/1999 |
| JP | A 2003-134290 | 5/2003 |
| JP | 2003-309712 | 10/2003 |
| JP | A 2004-165747 | 6/2004 |

* cited by examiner

FIG. 7

May 17 21:52:48 192.168.0.1 imageAuditd:scan uchikawa file://dev/storage/238473.img WORKSHOP APPLICATION FORM Java INTERMEDIATE COURCE ADDRESS...
May 17 21:31:01 192.168.0.11 imageAuditd:copy hikichi file://dev/storage/238474.img TECHNICAL REPORT CREATION DATE AND TIME MAY 17, 2003...
May 17 21:35:01 192.168.0.22 imageAuditd:fax unknown file://dev/storage/238475.img REQUEST FOR QUOTATION PERSONAL COMPUTER 3...
May 17 21:45:34 192.168.0.22 imageAuditd:fax unknown file://dev/storage/238476.img REQUEST FOR QUOTATION PERSONAL COMPUTER 3...
May 17 21:52:48 192.168.0.11 imageAuditd:scan kanazawa ftp://host.co.jp/development2003.doc [confidential] DEVELOPMENT PLANNING DEVELOPMENT CODE 123...

May 18 08:33:51 192.168.0.1 imageAuditd:copy yamamoto file://dev/storage/238474.img TECHNICAL REPORT CREATION DATE AND TIME MAY 18, 2003...
May 18 08:93:32 192.168.0.1 imageAuditd:copy uchikawa file://dev/storage/238475.img WORKSHOP APPLICATION FORM C++ INTERMEDIATE COURCE ADDRESS...

FIG. 8

| DATE AND TIME | DEVICE ADDRESS | PROGRAM NAME | KIND OF JOB | USER NAME | IMAGE DATA STORAGE URI | TEXT DATA |
|---|---|---|---|---|---|---|
| 8001 | 8002 | 8003 | 8004 | 8005 | 8006 | 8007 |
| May 17 21:52:48 | 192.168.0.1 | imageAuditd: | scan | uchikawa | file://dev/storage/238473 | WORKSHOP APPLICATION FORM Java INTERMEDIATE COURCE ADDRESS... |

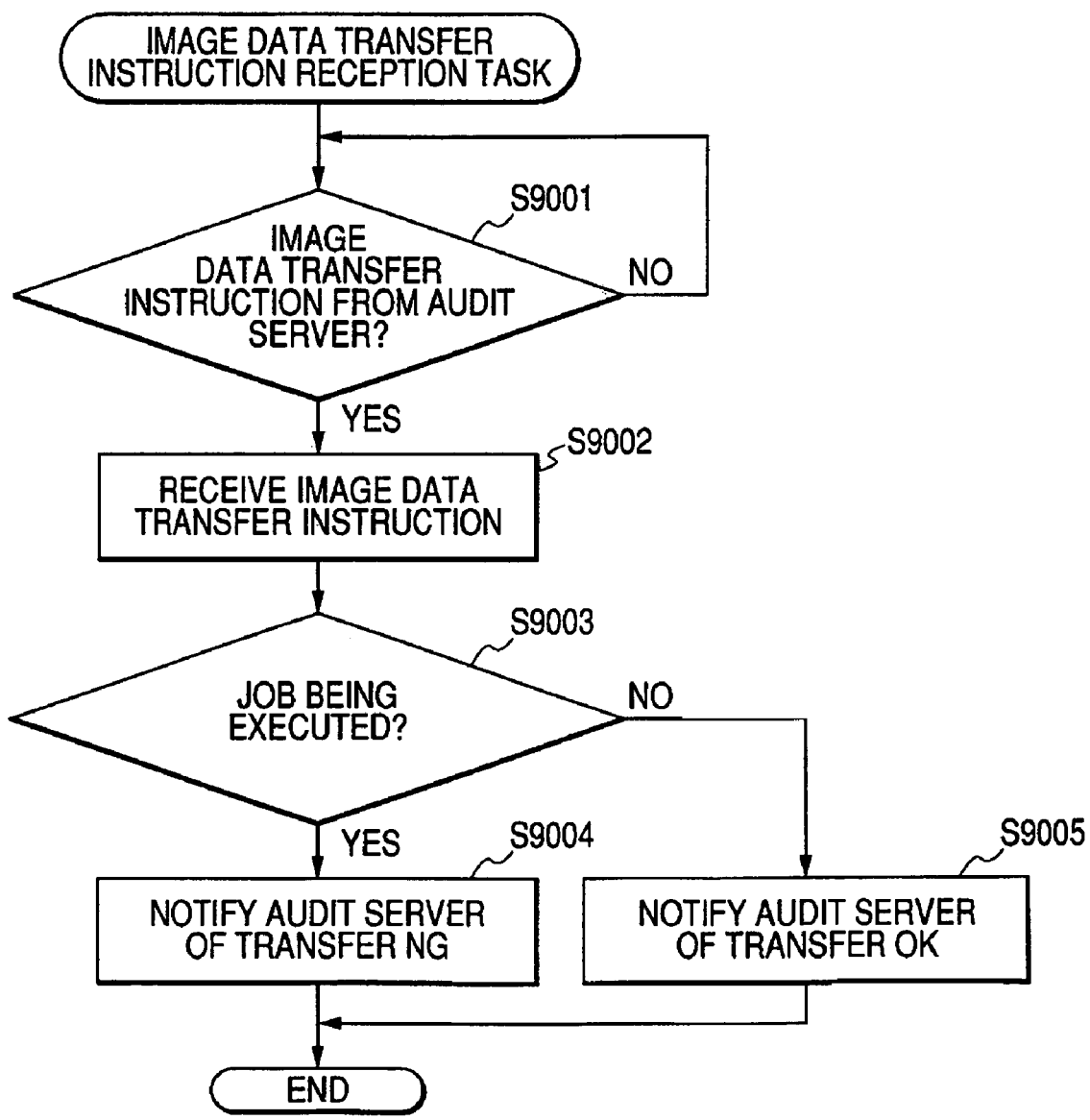

IMAGE PROCESSING SYSTEM, IMAGE PROCESSING DEVICE, AND AUDIT DATA TRANSFER MODE

BACKGROUND OF THE INVENTION

1. Field of the Invention

The present invention relates to an image processing system, an image processing device, and an audit data transfer method. In particular, the present invention relates to a technique which is suitable to manage, by using a server, image data input and image-processed in the image processing device and history information generated in association with the execution of the image process.

2. Related Background Art

In recent years, as digital copying machines become widespread, anybody can copy and transmit various original images, it becomes a serious problem in the viewpoint of a leakage of information in case of copying and transmitting a secret original or the like even if such a spread of the digital copying machines improves user's convenience. To cope with the relevant problem, there is the digital copying machine which stores, in case of copying and transferring the original image, all the read image data in its storage unit such as a hard disk drive (HDD) or the like (for example, refer to Japanese Patent Application Laid-Open No. H06-270477). Thus, it is possible to chase when, where and what process was executed to the original by confirming with the administrator by which image processing device the original from which the information has been leaked was read.

Moreover, a job archive (chasing) system consisting of a digital copying machine, an audit server and the like is proposed. In the job archive system, the image data of the job executed in the digital copying machine and the history information of the image data are once stored in the HDD of the digital copying machine, and the image data and the history information thereof both stored in the HDD are then transferred and managed in the audit server. In the job archive (chasing) system, the storage capacity of the HDD of each digital copying machine is limited because the cost increases if the capacity of the HDD is made large and other intended use of the HDD occurs. In consideration of such limitation, a system which stores and manages image data by transferring through a network the image data to an audit server having a large-capacity storage means so that the transferred image data (equivalent to the audit image data capable of being confirmed and checked later by the administrator) respectively stored in the plural digital copying machines are stored and managed in a lump by the audit server is proposed. Here, it should be noted that the audit image data is also called chasing image data, and the audit image data (chasing image data) is stored in the audit server or the like for later chasing (process confirmation), independently of the execution of copying and printing.

However, in the above system, the size of the chasing image data to be transferred (transmitted) from the digital copying machine to the audit server is typically highly large. Moreover, in the job archive system, since the chasing image data of the plural copying machines are transmitted to the audit server, the large-sized data transfer (transmission) occurs many times. Therefore, if each digital copying machine independently transfers the chasing image data to the audit server at arbitrary timing, the transfer of the chasing image data concentrates at specific time zone, whereby it bears a load on the network and also bears a load on the audit server.

Moreover, in a case where the job (image processing operations such as copying, printing and the like) is executed in the digital copying machine while the chasing image data is being transferred from the digital copying machine to the audit server, there is fear that the performance of the relevant job decreases. Particularly, if the size of the image data to be transferred to the audit server is large, it takes a long period of time until the transfer ends, whereby the performance of the job decreases for a relatively long period of time. It is apparent that the user never wishes such a state. That is, in any and all circumstances, the user is sure to wish highest throughput in the copying and the printing.

As described above, in the related background art, if the image data is transferred from the image formation device such as the digital copying machine or the like to the audit server at arbitrary timing, the problem of load to the network and the audit server occurs. In addition, the problem of decreasing the performance of the job in the image formation device occurs.

SUMMARY OF THE INVENTION

The present invention is completed in order to solve the above problems of the related background art, and an object thereof is to decrease loads to a network and an audit server in a job archive system. Further, another object of the present invention is to prevent as much as possible that the performance of a job in an image formation device decreases.

Still another object of the present invention is to provide an image processing system which is configured by providing an image processing device for executing an image process to input image data and a server device, wherein: the image processing device comprises a storage unit adapted to store audit data including the input image data and history information generated in association with execution of the image process to the image data; the server device comprises an acquisition unit adapted to acquire the audit data stored in the storage unit, and an audit data storage unit adapted to store the audit data acquired by the acquisition unit; and in the case where the image process is executed by the image processing device, the acquisition of the audit data by the acquisition unit is inhibited.

Still another object of the present invention is to provide an image processing device comprising: a storage unit adapted to store audit data including input image data and history information generated in association with execution of an image process to the image data; a transmission unit adapted to read the audit data stored in the storage unit and transmit the read audit data to an external device; and a time setting unit adapted to set a time when the transmission unit transmits the audit data, wherein, at the time set by the time setting unit, the transmission unit reads and transmits the audit data stored in the storage unit by the set time to the external device.

Still another object of the present invention is to provide an image processing device comprising: an image processing unit adapted to execute an image process to input image data; a storage unit adapted to store audit data including the input image data and history information generated in association with execution of the image process to be executed to the input image data by the image processing unit; a transfer unit adapted, based on an instruction from an external device, to read the audit data stored in the storage unit and transfer the read audit data to the external device; and a notification unit adapted, in the case where the image processing unit executes the image process, to issue a notification to the external device to stop the transfer process by the transfer unit based on the instruction from the external device.

Still another object of the present invention is to provide an audit data transfer method in an image processing system which is configured by providing an image processing device for executing an image process to input image data and a server device, the method comprising: a storage step of storing audit data including the input image data and history information generated in association with execution of the image process to the image data; a transfer step of transferring the audit data stored in the storage step to the server device; and an audit data storage step of storing the audit data acquired in the transfer step, wherein, in the case where the image process is executed by the image processing device, the transfer of the audit data in the transfer step is inhibited.

Still another object of the present invention is to provide an audit data transfer method in an image processing device, comprising: a storage step of storing audit data including input image data and history information generated in association with execution of an image process to the image data; a transmission step of reading the audit data stored in the storage step and transmitting the read audit data to an external device; and a time setting step of setting a time when the audit data is transmitted in the transmission step, wherein, at the time set in the time setting step, the transmission step is adapted to read and transmit the audit data stored in the storage step by the set time to the external device.

Still another object of the present invention is to provide an audit data transfer method in an image processing device, comprising: an image processing step of executing an image process to input image data; a storage step of storing audit data including the input image data and history information generated in association with execution of the image process to be executed to the input image data in the image processing step; a transfer step of, based on an instruction from an external device, reading the audit data stored in the storage step and transferring the read audit data to the external device; and a notification step of, in the case where the image process is executed in the image processing step, issuing a notification to the external device to stop the transfer process in the transfer step based on the instruction from the external device.

Further, the programs for executing the above audit data transfer methods and the computer-readable storage media of storing the programs for executing the above audit data transfer methods are provided.

Other object and features of the present invention will become apparent from the following description in conjunction with the accompanying drawings.

BRIEF DESCRIPTION OF THE DRAWINGS

FIG. 7 is a diagram showing an example of the history file recorded on the HDD;

FIG. 8 is a diagram showing an example of the meaning of each entry of the history record recorded on the HDD;

FIG. 9 is a flow chart for explaining an example of the process in a case where a transfer instruction reception task of the audit image data and the history record is executed;

DETAILED DESCRIPTION OF THE PREFERRED EMBODIMENTS

First Embodiment

Hereinafter, the first embodiment of the present invention will be explained in detail with reference to the accompanying drawings.

Figure 1:
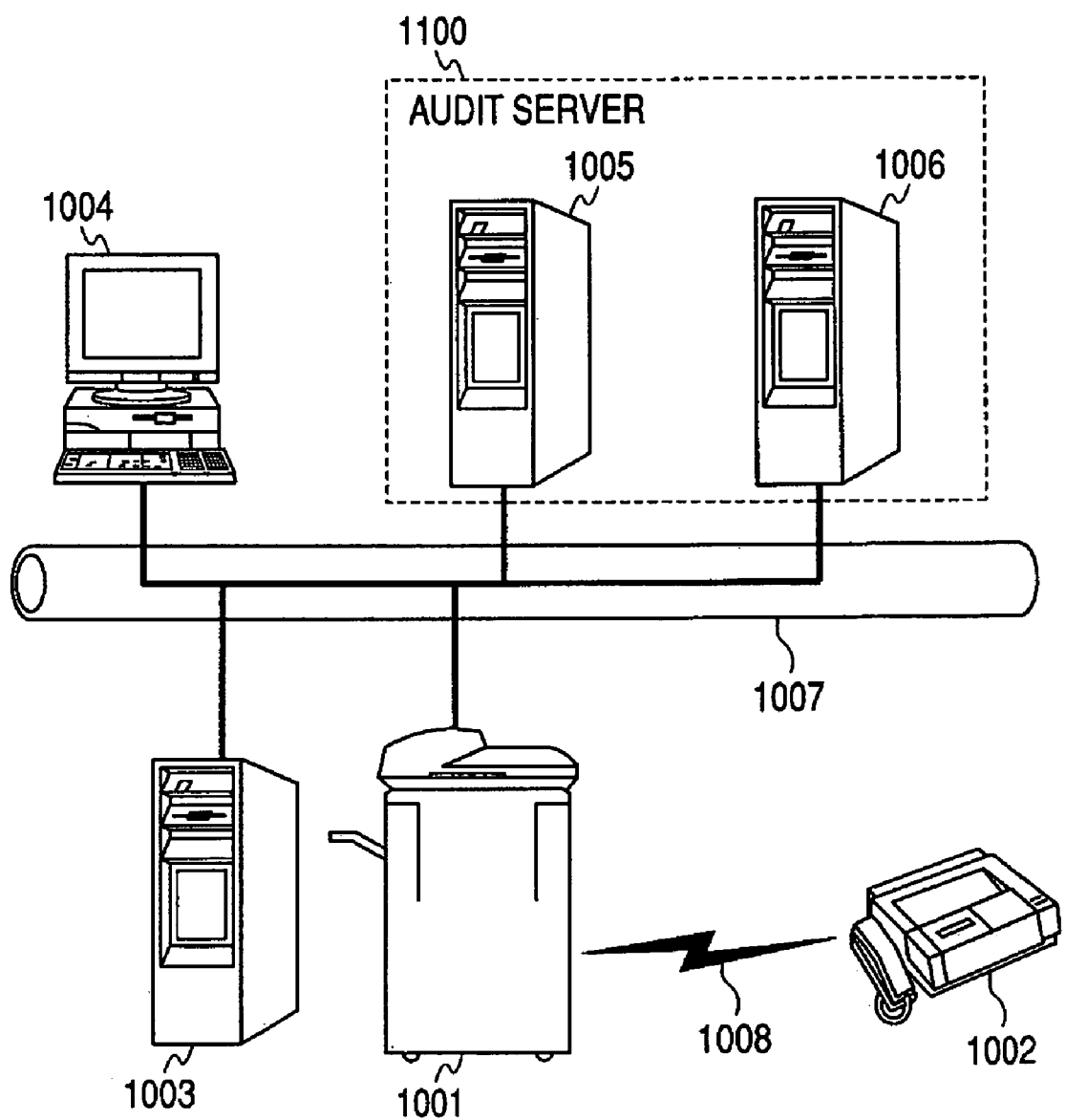
FIG. 1 is a diagram showing an example of the basic configuration of an image processing system according to the embodiments of the present invention.

FIG. 1 is a diagram showing an example of the basic configuration of an image processing system according to the present embodiment. In FIG. 1, a copying machine 1001 is the image processing device which has the function as a digital multifunctional machine. More specifically, the copying machine 1001 has the following image processing functions: a scan function for reading an original, generating image data from the read original, and storing the generated image data inside the copying machine 1001 or in an external storage unit; a copy function for copying the original; a facsimile function for transmitting the image data of the read original to various devices; and a print function for converting print data input from a client computer into the image data and print-outputting the converted image data. Here, it should be noted that the above image processing functions to be executed by the copying machine 1001 are called as jobs. Besides, a facsimile machine 1002 receives the image data of the original read by the copying machine 1001 through a public line 1008 and prints the received image data.

A database/mail server 1003 is the computer on which an application server for storing the image data of the original read by the copying machine 1001 operates. Moreover, the database/mail server 1003 can store also user information to be used for user authentication. A client computer 1004, which is mutually connected to the database/mail server 1003 through an Ethernet™ 1007, downloads and displays, e.g., the data stored in the database/mail server 1003.

A storage server 1005 is the audit storage device which stores all the image data of the originals read by the copying machine 1001, and a history management server 1006 is the history management server which records the histories of copy and transmission jobs executed by the copying device

1001. In FIG. 1, the storage server 1005 and the history management server 1006 constitute an audit server 1100.

Incidentally, it should be noted that the storage server 1005 may be physically independent of the history management server 1006, or the storage server 1005 and the history management server 1006 may by physically integrated. That is, such a constitution is determined dependent on the system constitution to be adopted.

The Ethernet™ 1007 is the network for mutually connecting the copying machine 1001, the database/mail server 1003, the client computer 1004, the storage server 10005 and the history management server 1006.

Figure 2:
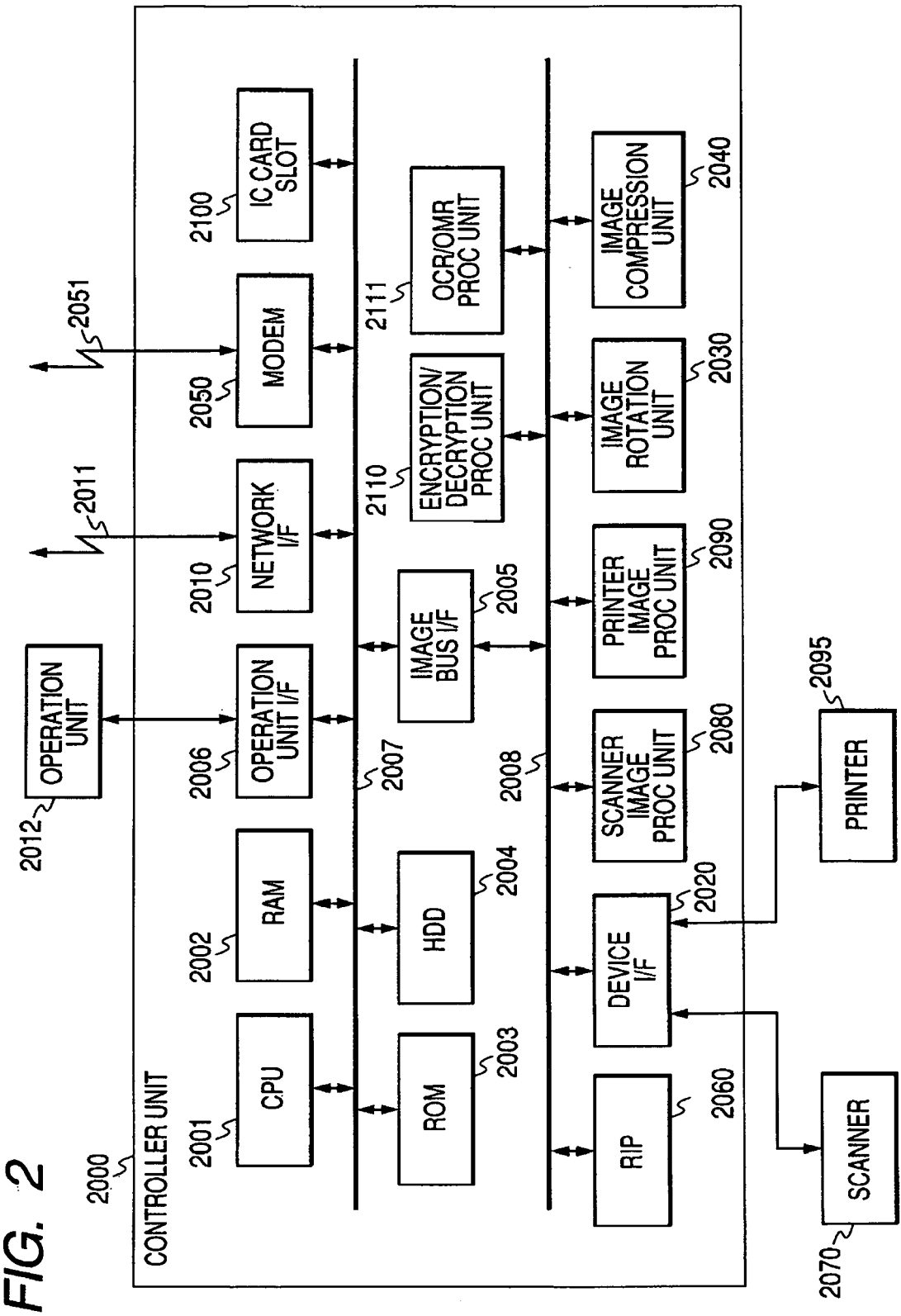
FIG. 2 is a block diagram showing an example of the constitution of a copying machine in the image processing system.

FIG. 2 is a block diagram showing an example of the constitution of the copying machine 1001. In FIG. 2, a scanner 2070 acting as an image input device and a printer 2095 acting as an image output device are connected to a controller unit 2000. Also, a LAN (local area network) 2011 (corresponding to the Ethernet™ 1007 of FIG. 1) and a WAN (wide area network) 2051 being one example of the public line 1008 are connected to the controller unit 2000. Thus, the controller unit 2000 acts to input and output various image information and device information.

A CPU (central processing unit) 2001 is the controller which controls the whole system, and a RAM (random access memory) 2002 is the system work memory which is used when the CPU 2001 operates. Also, the RAM 2002 is the image memory which temporarily stores the image data. A ROM (read only memory) 2003 is the boot ROM which stores the boot program for the system, and an HDD 2004 is the hard disk drive which stores the system software, the image data, the history record (log) and the like.

An operation unit I/F (interface) 2006 is the interface unit which interfaces with an operation unit (UI: user interface) 2012 having the touch panel. Further, the operation unit I/F 2006 outputs the image data to be displayed on the operation unit 2012, and transfers to the CPU 2001 the information input by the user of the system through the operation unit 2012. A network I/F 2010 is the interface unit which is connected to the LAN 2011 to input and output the information. A modem 2050 is the unit which is connected to the public line 2051 to input and output the information.

It is possible, through an IC (integrated circuit) card slot 2100, to input and output the key to be used in encryption and decryption, if an appropriate PIN (Personal Identifier Number) code is input after an IC card medium was inserted into the IC card slot 2100. In any case, it should be noted that the above units are all disposed on a system bus 2007.

An image bus I/F 2005 is the bus bridge which connects the system bus 2007 with an image bus 2008 for transferring the image data at high speed, whereby the image bus I/F 2005 converts the data structure. Here, it should be noted that the following units are disposed on the image bus 2008.

An RIP (raster image processor) 2060 extracts a PDL (page description language) code included in the print data received from the client computer 1004 or the like into a bitmap image, a device I/F 2020 connects the scanner 2070 and the printer 2095 which act as the image input/output device to execute conversion of synchronous system/asynchronous system of the image data, a scanner image processing unit 2080 executes correction editing processes and the like to the input image data, a printer image processing unit 2090 executes printer correction and resolution conversion processes and the like to the print output image data, and an image rotation unit 2030 executes a rotation process to the image data. Further, an image compression unit 2040 executes a JPEG (Joint Photographic Experts Group) compression/extraction process to multivalued image data, and also executes JBIG (Joint Bi-level Image experts Group), MMR (Modified Modified READ) and MH (Modified Huffman) compression/extraction processes to binary image data.

An encryption/decryption processing unit 2110 is the hardware accelerator board which executes encryption and decryption processes for the data by using the key input through the IC card slot 2100, and an OCR/OMR (optical character recognition/optical mark recognition) processing unit 2111 executes the process of decrypting character information and a two-dimensional bar code included in the image data for character coding.

Figure 3:
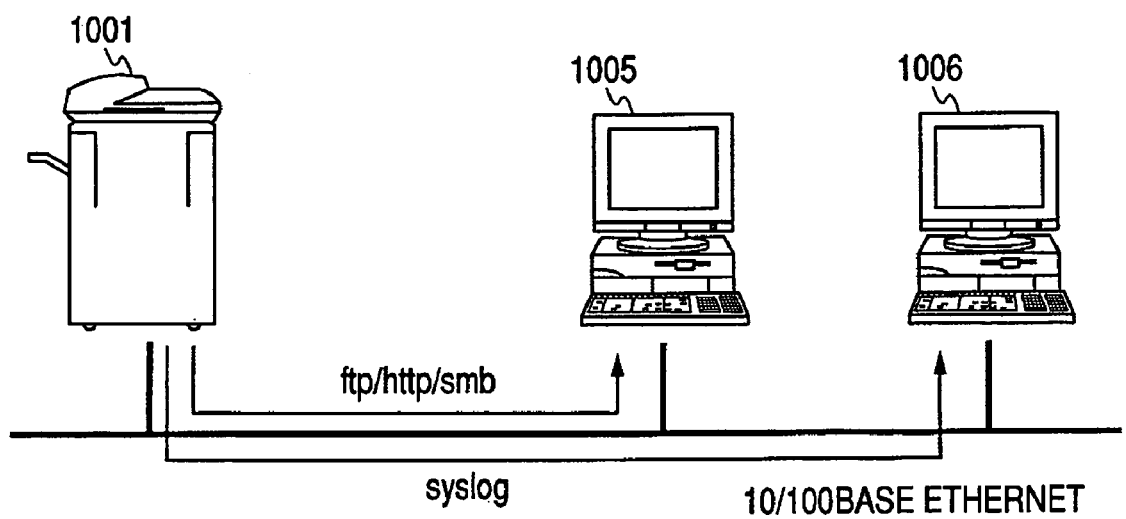
FIG. 3 is a diagram showing an example of the configuration of the image processing system in a case where the copying machine writes audit image data and a history record respectively to a storage server and a history management server.

FIG. 3 is a diagram showing an example of the configuration of the image processing system in a case where the copying machine 1001 writes the image data and the history record respectively to the storage server 1005 and the history management server 1006.

In FIG. 3, in a case where the image data from the copying machine 1001 is stored in the storage server 1005 by using the Ethernet™ 1007, the HTTP (HyperText Transfer Protocol), the HTTPS (HyperText Transfer Protocol Security), the FTP (File Transfer Protocol) or the SMB (Server Message Block) is used. However, the present invention is not limited to this. That is, it is possible to use another protocol capable of transferring data, and it is also possible to execute an encryption process to the image data according to need.

Besides, in a case where the history record from the copying machine 1001 is written on the history management server 1006, "syslog" is used. However, the present invention is not limited to this. That is, it is possible to use another existing logging protocol. Moreover, in the present embodiment, each of the copying machine 1001, the storage server 1005 and the history management server 1006 is constituted independently. However, two or more of the copying machine 1001, the storage server 1005 and the history management server 1006 may be appropriately combined. Incidentally, it should be noted that the setting information which is necessary to access the storage server 1005 and the history management server 1006 is protected so that only the system administrator of the copying machine 1001 can set it.

Figure 4:
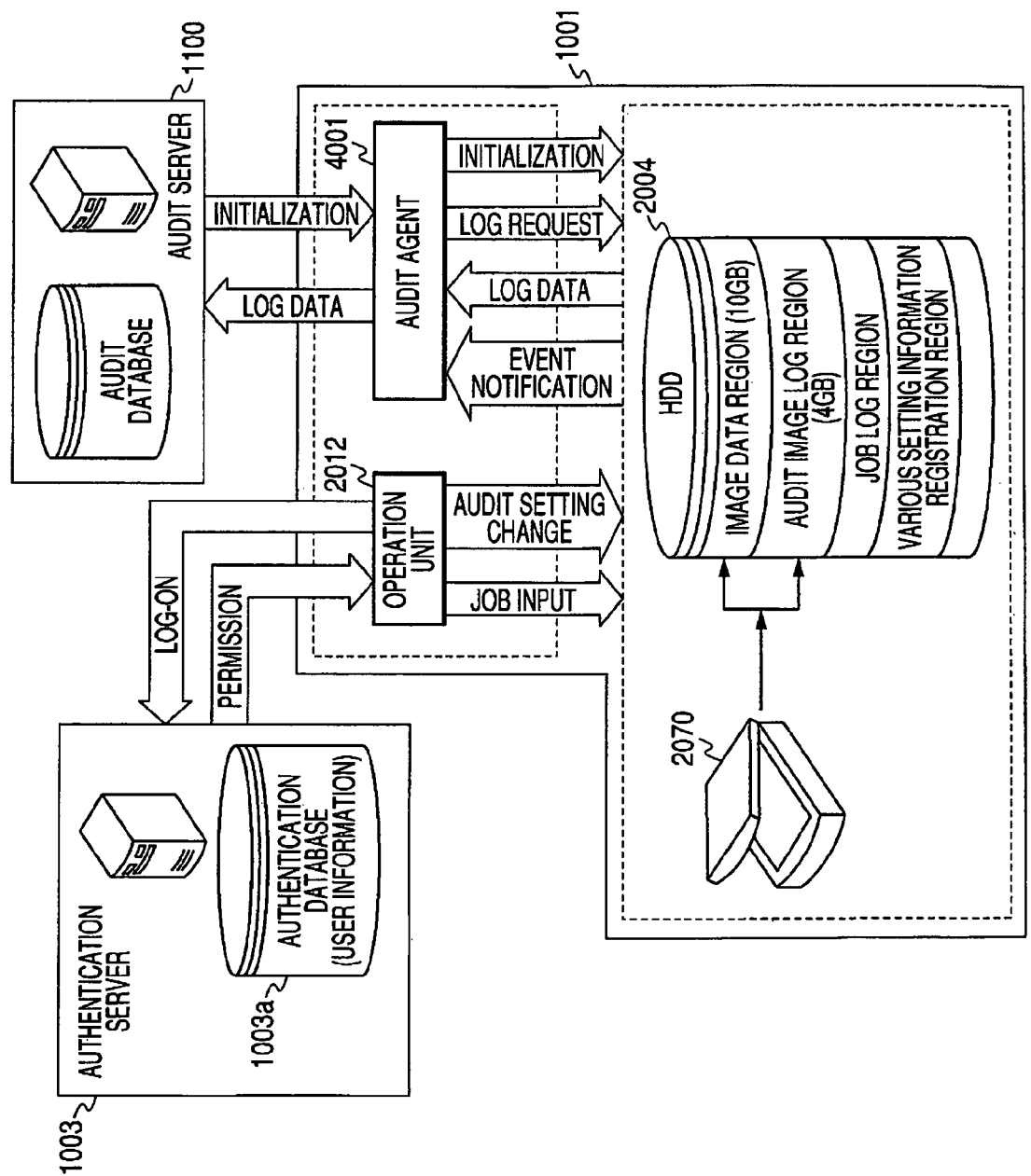
FIG. 4 is a diagram showing an example of the configuration of the image processing system in a case where the copying machine transfers, after authentication, the audit image data and the history record respectively stored in an HDD to an audit server.

FIG. 4 is a diagram showing an example of the configuration of the image processing system in a case where the copying machine 1001 transfers, after authentication, the image data and the history record respectively stored in the HDD 2004 to the audit server 1100.

In FIG. 4, the database/mail server 1003 which functions as an authentication server is equipped with an authentication database 1003a for storing the user information. Thus, the database/mail server 1003 controls log-on (success and failure), log-off and the like by checking the user name and the password input from the operation unit 2012 of the copying machine 1001 and the user information stored in the authentication database 1003a. Moreover, the database/mail server 1003 can execute new creation, change and deletion of the user of the authentication database 1003a.

Here, the region on the HDD 2004 of the copying machine 1001 is classified into the image data region for storing ordinary image data (that is, the region for registering image data in copying and printing), the audit image log region for storing an audit image (that is, the region for storing a chasing image), the job log region for registering a history record, the region (various setting information registration region) for registering various setting information (audit server setting information, audit password information, etc.), and the like.

An audit agent 4001 which is the software module installed in the copying machine 1001 initializes the communication between the audit server 1100 and the copying machine 1001. Moreover, the audit agent 4001 transmits the audit image data stored in the audit image log region and the history record stored in the job log region on the HDD 2004 of the copying machine 1001 at a certain period (for example, every night, every weekend, or the like) to the audit server 1100 (that is, the storage server 1005 and the history management server 1006). In the following, it is assumed that the audit image data and the history record are included in the audit data. The schedule of the audit agent 4001 for transmitting the audit data to the audit server 1100 at the certain period is stored in the predetermined region on the HDD 2004, whereby the audit agent 4001 operates according to the stored schedule. Incidentally, the relevant schedule may be set from the operation unit 2012 through the user's operation. Alternatively, the relevant schedule may be set through the remote operation from an external computer (for example, the client computer 1004) managed by the administrator.

Further, to prevent that another device disguises itself as the audit server 1100, the audit agent 4001 authenticates the audit server 1100. Then, the audit image data and the history record are associated with each other by using the later-described URI, and the acquired data are then encrypted and stored by using the inherent key in the copying machine 1001. Here, it should be noted that the inherent key of the copying machine 1001 can arbitrarily be set by the system administrator from the operation unit 2012. Moreover, in order to guarantee that the data is stored even if the power supply is suddenly intercepted, the image data is written with respect to each page.

Figure 5:
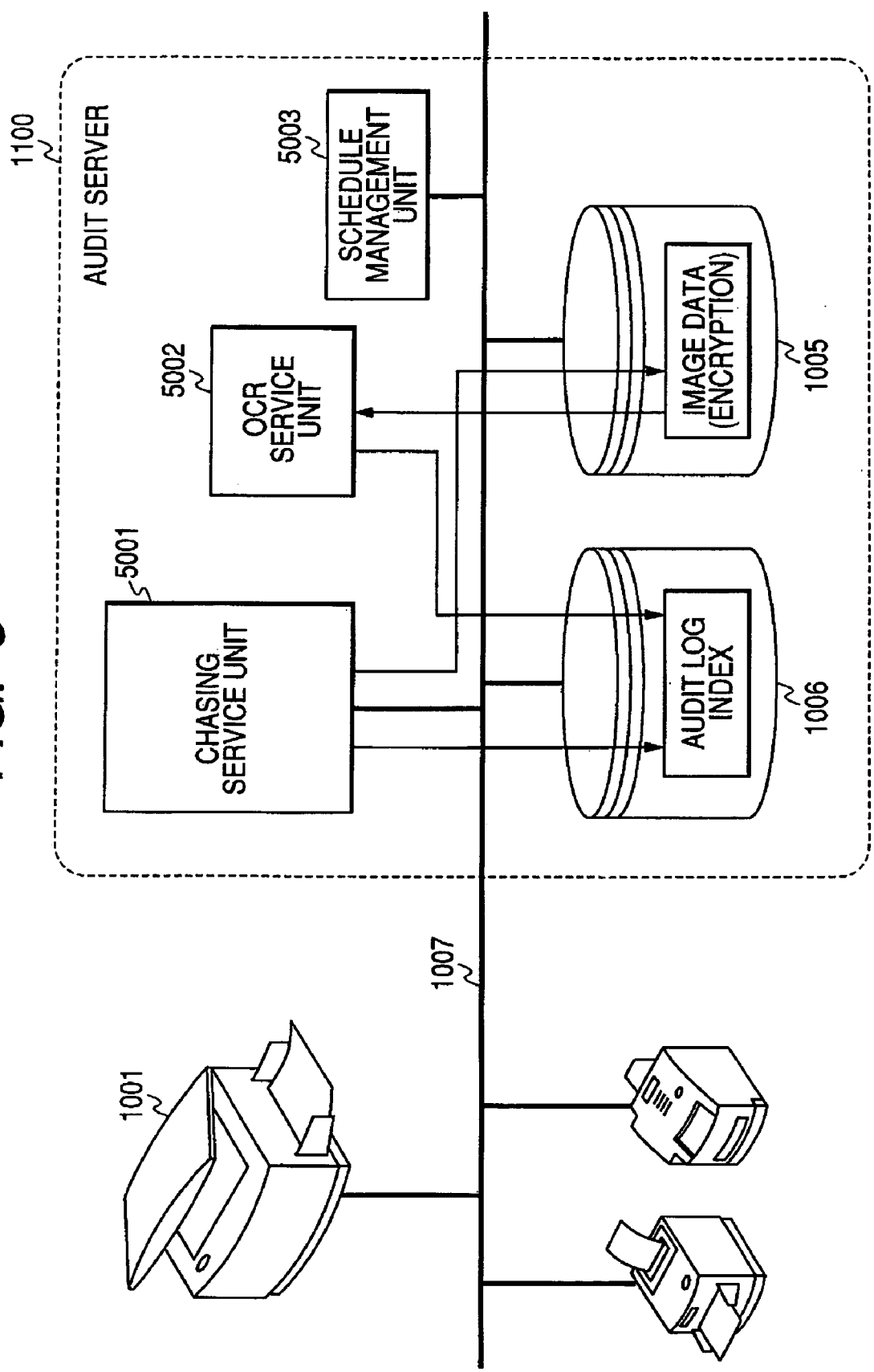
FIG. 5 is a diagram showing an example of the constitution of the audit server.

FIG. 5 is a diagram showing an example of the constitution of the audit server 1100. In the following, the respective constituent components of the audit server 1100 will be explained.

First, a chasing service unit 5001 converts the resolution of the image data to save the disk space of the audit server 1100. For example, the chasing service unit 5001 converts the data of 600 dpi into the data of 300 dpi. Moreover, if it intends to reduce the network traffic, the resolution may be converted in the copying machine 1001.

An OCR (optical character recognition) service unit 5002 executes an OCR process for the audit image data to extract the text data, and then stores the extracted text data together with the history record. Thus, it is possible, by storing the audit image data together with the history record, to improve searching capability for the history audit image data.

A schedule management unit 5003 manages the schedule of the audit server 1100 for executing the process to acquire the audit data stored in the HDD 2004 of the copying machine 1001. Here, it should be noted that, as the schedule, it is possible to set "every day", "every week" and the like by respectively setting "date and time", "day of the week" and the like.

In addition to the copying machine 1001, the not-shown plural copying machines are connected to the Ethernet™ 1007, whereby the audit server 1100 can acquire the audit data for these copying machines. Therefore, the schedule management unit 5003 manages the audit data acquisition schedule for each of these copying machines.

Incidentally, in the present embodiment, the HTTPS is adopted for the communication between the copying machine 1001 and the audit server 1100, and the image data, the history record and the like are encrypted by using the SSL (Secure Socket Layer) and then communicated, whereby it is possible to achieve more secure communication. However, it is of course possible to adopt another encryption communication method. Besides, if the data in the audit image log region and the job log region on the HDD 2004 have been already encrypted, the encryption communication need not necessarily be executed.

Figure 6:
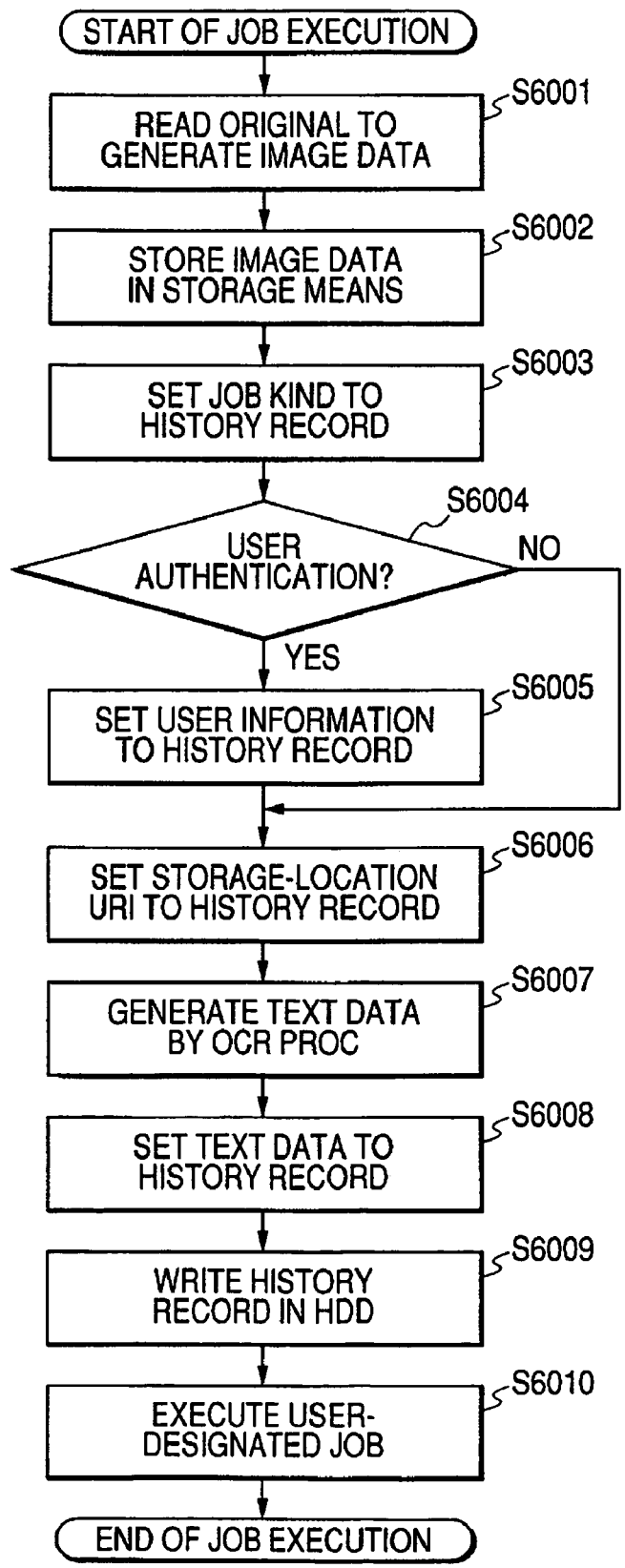
FIG. 6 is a flow chart showing an example of the process that the read image data is stored in the HDD, and its URI (Uniform Resource Identifier) and text data included in the read image data are recorded in the history record.

FIG. 6 is a flow chart showing an example of the process of the copying machine 1001 that the read image data is stored in the HDD (that is, predetermined storage means) 2004, and its URI and the text data included in the read image data are recorded in the history record. Here, it should be noted that the process shown in FIG. 6 is achieved when the CPU 2001 in the controller unit 2000 of the copying machine 1001 loads the program stored in the HDD 2004 or the ROM 2003 and then executes the loaded program.

More specifically, the user first puts an original on the automatic document (original) feeder or the original glass plate of the scanner 2070, executes the number setting, the destination setting and the like according to desired purpose such as copying, transmission or the like, and then instructs to start the job execution. Here, it should be noted that the kinds of jobs to be instructed here are copying, scanning, facsimile transmission and the like.

Subsequently, in a step S6001, the original is read by the scanner 2070 to generate the image data. Then, in a step S6002, the generated image data are sequentially recorded as the audit image data (that is, the chasing image data) in the audit image log region on the HDD (storage means) 2004 with respect to each page, if the original includes plural pages. Here, the image data can be stored in the HDD 2004 so that each of the plural pages is stored as the individual file, or so that the plural pages are combined into one document and then stored as one file. Besides, the image data of the read original is also stored in the image data region of the HDD 2004 for primary job execution.

After the image data were stored in the HDD 2004 as above, the flow advances to a step S6003 to set, to the history record, the job kind of the job to be executed. Here, it should be noted that the job kind in the present embodiment is the kind of functions such as a copy function, a facsimile function, a scanning function and the like.

Next, in a step S6004, it is judged whether or not the copying machine 1001 has been set to have the user authentication. If it is judged that the copying machine 1001 has been set to have the user authentication, the flow advances to a step S6005 to set the user information such as a user name, a user ID and the like to the history record, and then the flow advances to a step S6006. Meanwhile, if it is judged in the step S6004 that the copying machine 1001 has been set not to have the user authentication, the flow skips the step S6005 and directly advances to the step S6006.

Subsequently, in the step S6006, the URI indicating the storage location of the audit image data stored in the step S6002 to the HDD 2004 is set to the history record. Then, in a step S6007, the OCR/OMR processing unit 2111 extracts the text data from the audit image data recorded in the HDD 2004. Here, the mechanism of extracting the text data from the audit image data by using the OCR function has been prepared also on the side of the audit server as the OCR service unit 5002. For this reason, it is possible to skip such a text data extraction process on the side of the copying machine 1001, so as to execute the relevant process on the side of the audit server 1100. In this connection, if the text data extraction process is executed on the side of the audit server 1100, it is possible to skip the process of the step S6007. Moreover, if the OCR function is not provided on the side of the copying machine, the text data extraction process is executed, on the side of the audit server 1100, to all the audit images generated by the relevant copying machine.

Then, the text data extracted in the step S6007 is set to the history record in a step S6008, and the history record is written into the HDD 2004 in a step S6009. After the history record was recorded in the HDD 2004 as above, the flow advances to a step S6010 to execute the job designated by the user before the process in the step S6001 is executed. Thus, the job execution normally ends. Incidentally, in the case where the text data extraction process in the step S6007 is skipped, the text data is not set to the history record. Besides, it should be noted that, according to a kind of job, the information has to be set to the history record after the job execution ended. Thus, the relevant information is additionally set to the history record after the job execution ended in the step S6010. For example, in such a case of facsimile transmission where the execution result information indicating whether or not the transmission correctly ended is set to the history record, the result of the transmission process is judged after the transmission operation ended, and the judged result is set to the history record.

FIG. 7 is a diagram showing an example of the history file recorded in the HDD 2004. Here, it should be noted that the history record is recorded in the history file.

In the copying machine 1001, according to the flow chart shown in FIG. 6, the history writing is executed in units of job, and one record is generated in units of job. The history file which is constituted by the history records is stored in the HDD 2004 for a certain period, whereby the stored history file can be later used in the audit process.

FIG. 8 is a diagram showing an example of the meaning of each entry of the history record recorded on the HDD 2004.

In FIG. 8, "data and time" 8001 is the date and time when the history writing is executed. The copying machine 1001 essentially includes a timer function (not shown), whereby the date and time to be stored is acquired by using the timer function. Besides, it is also possible to acquire accurate date and time from an external time server (not shown) and then record the acquired date and time.

Besides, "device address" 8002 is the IP (Internet Protocol) address of the device such as the copying machine or the like which executes the job or is the host name, "program name" 8003 is the program name by which the history writing is executed, "kind of job" 8004 is the kinds of functions such as a copying function, a facsimile function, a scanning function and the like, and "user name" 8005 is the user name which is constituted by a character string enabling to discriminate the user who executes the job or is the user ID which is constituted by numeric values. Moreover, "image data storage URI" 8006 is the URI which indicates the storage location in the HDD 2004 where the audit image data is stored. Here, the user can access the audit image data of the read original, by accessing the URI indicated by "image data storage URI" 8006. Besides, "text data" 8007 is the text data which is extracted by the OCR/OMR processing unit 2111 from the read data. Incidentally, the various setting items such as the output page number, the copy number and the like of the image data may be included in the history data.

Incidentally, in the case where the text data extraction process in the step S6007 of FIG. 6 is skipped, "text data" 8007 is blank. Then, the history record is transferred to the audit server 1100, and thereafter the audit server 1100 executes the text data extraction process to the audit image data corresponding to the history record in which "text data" 8007 is blank. Thus, the text data extraction process to which a relatively long processing time is necessary can be distributed to the copying machine 1001 and the audit server 1100. Moreover, even in the case where any text data cannot be extracted through the OCR process by the copying machine 1001 because the audit image data represents a photographic image or the like, it is possible to set the information indicating "text extraction impossible" to the item of "text data" 8007. Thus, it is unnecessary in the audit server 1100 to redundantly extract the text data from the audit image data from which the text data could not be extracted in the copying machine 1001.

In the present embodiment, it should be noted that the copying machine 1001 and the audit server 1100 are respectively constituted so that the plural processing tasks are executed in parallel. Hereinafter, the processing task which is equivalent to the characteristic in the present embodiment will be explained in detail.

FIG. 9 is a flow chart for explaining an example of the process in a case where a transfer instruction reception task of the audit image data (chasing image data) and the history record is executed. Here, it should be noted that the audit image data and the history record are called the audit data in a lump, and that the relevant process is achieved by executing the audit agent 4001 of the copying machine 1001 with the CPU in the controller unit 2000.

Before the transfer instruction reception task is executed, the instruction for transferring the audit data stored in the HDD 2004 (that is, the instruction for transferring the audit image data from the HDD 20044 to the audit server 1100) is schedule-managed by the schedule management unit 5003 and periodically issued from the audit server 1100 to the copying machine 1001. Thus, the transfer instruction reception task is executed based on such an image data transfer instruction. Incidentally, in the transfer instruction reception task, the audit agent 4001 installed in the copying machine 1001 always checks whether or not the transfer instruction for the audit data is issued from the audit server 1100. Then, when the transfer instruction is received, the transfer instruction reception task notifies the audit server 1100 whether or not to be able to transfer the audit data transfer-instructed from the audit server 1100. Hereinafter, the transfer instruction reception task will be explained in detail.

First, in a step S9001, it is confirmed whether or not the transfer instruction of the image is issued from the audit server 1100. If the transfer instruction is issued from the audit server 1100, the flow advances to a step S9002 to receive or accept the transfer instruction of the audit data. Then, it is checked in a step S9003 whether or not the job (copying, printing, scanning, facsimile, etc.) is being executed by the copying machine 1001 when the relevant instruction is received. If it is checked that the job is being executed, the flow advances to a step S9004 to notify the audit server 1100 that the audit data cannot be transferred. Meanwhile, if it is checked that the job is not executed, the flow advances to a step S9005 to notify the audit server 1100 that the audit data can be transferred, and then the transfer instruction reception task ends.

Figure 10:
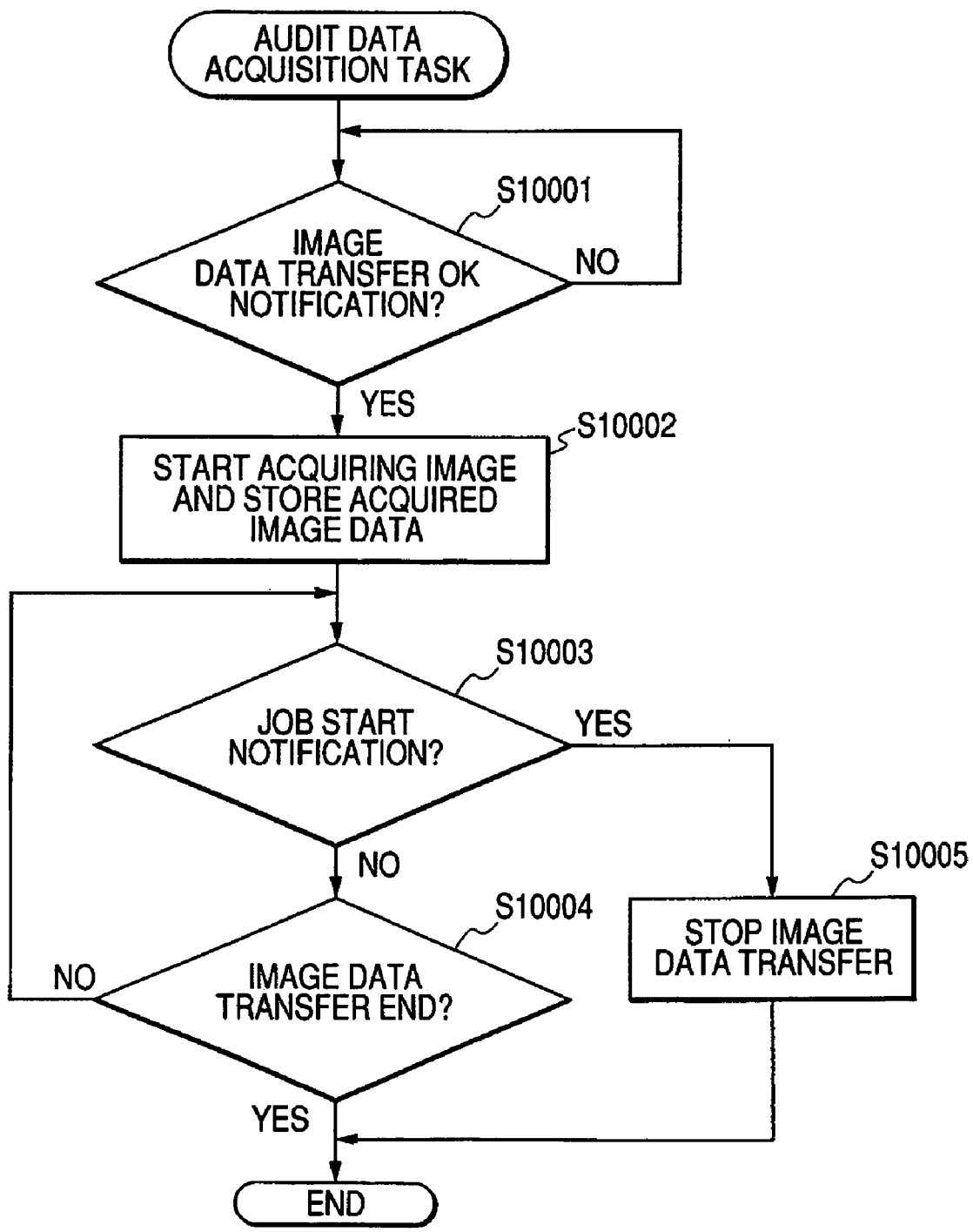
FIG. 10 is a flow chart for explaining an example of the process in a case where a transfer task of the audit image data transfer-requested from the audit server is executed.

FIG. 10 is a flow chart for explaining an example of the process to be executed in case of executing a transfer task (or an acquisition task) of the audit data in the audit server 1100. Here, it should be noted that the relevant process is executed by the audit server.

First, it is confirmed in a step S10001 whether or not the notification that the audit data can be transferred is received from the copying machine 1001. Then, if the notification that the audit data can be transferred is received from the copying machine 1001 which executed the process in the step S9005 of FIG. 9, the flow advances to a step S10002 to start an acquisition process of the audit data stored in the HDD 2004 of the copying machine 1001. At that time, the audit image data in the acquired audit data is stored in the storage server 1005 of the audit server 1100, and the history record in the acquired audit data is stored or recorded in the history management server 1006. Thus, the storage location of the audit image data is changed from the HDD 2004 to the storage server 1005. For this reason, in the step S10002, the process of updating the image data storage URI in the history record of FIG. 8 to the storage location in the storage server 1005 is further executed.

Then, it is periodically checked in a step S10003 whether or not the job start notification is received from the copying machine 1001. If the job start notification is received from the copying machine 1001 while the audit data is being transferred, the flow advances to a step S10005 to immediately stop the acquisition process of the audit data. Meanwhile, if the job start notification is not received, the flow advances to a step S10004 to continue the acquisition process of the audit data. Then, the acquisition task ends as soon as the transfer of the audit data ends. Incidentally, it is also possible to suspend the acquisition process of the audit data in the step S10005. In that case, after the job end notification is received from the copying machine 1001, the suspended acquisition process is restarted. Alternatively, to restart the acquisition process may not be controlled by the audit server 1100. In that case, the acquisition process would be controlled by the copying machine 1001 according to process of a flow chart shown in FIG. 11.

Besides, according to the software constitution or user environment/setting, also the following process can be executed. That is, the transfer schedule (date, time, etc.) of the audit image data is previously transmitted to the audit agent 4001 by the audit server 1100 or the client computer 1004 handled by the administrator. Then, the audit agent 4001 sets to transmit the audit image data and the history data stored in the HDD 2004 to the audit server 1100 based on the received transfer schedule. In a system that the plural copying machines are connected to the Ethernet™ 1007 and thus each of the connected copying machines transmits the audit data to the audit server 1100, a different date, a different day of the week, or a different time zone can be set as the transfer schedule to the audit agent of each copying machine. Thus, the transfer of the audit data from the respective copying machines do not concentrate in the same time zone, whereby it is possible to reduce the loads to the Ethernet™ 1007 and the audit server 1100. As just described, may variations of the transfer of the audit image data and the like have been prepared to be able to cope with the various user environments.

Figure 11:
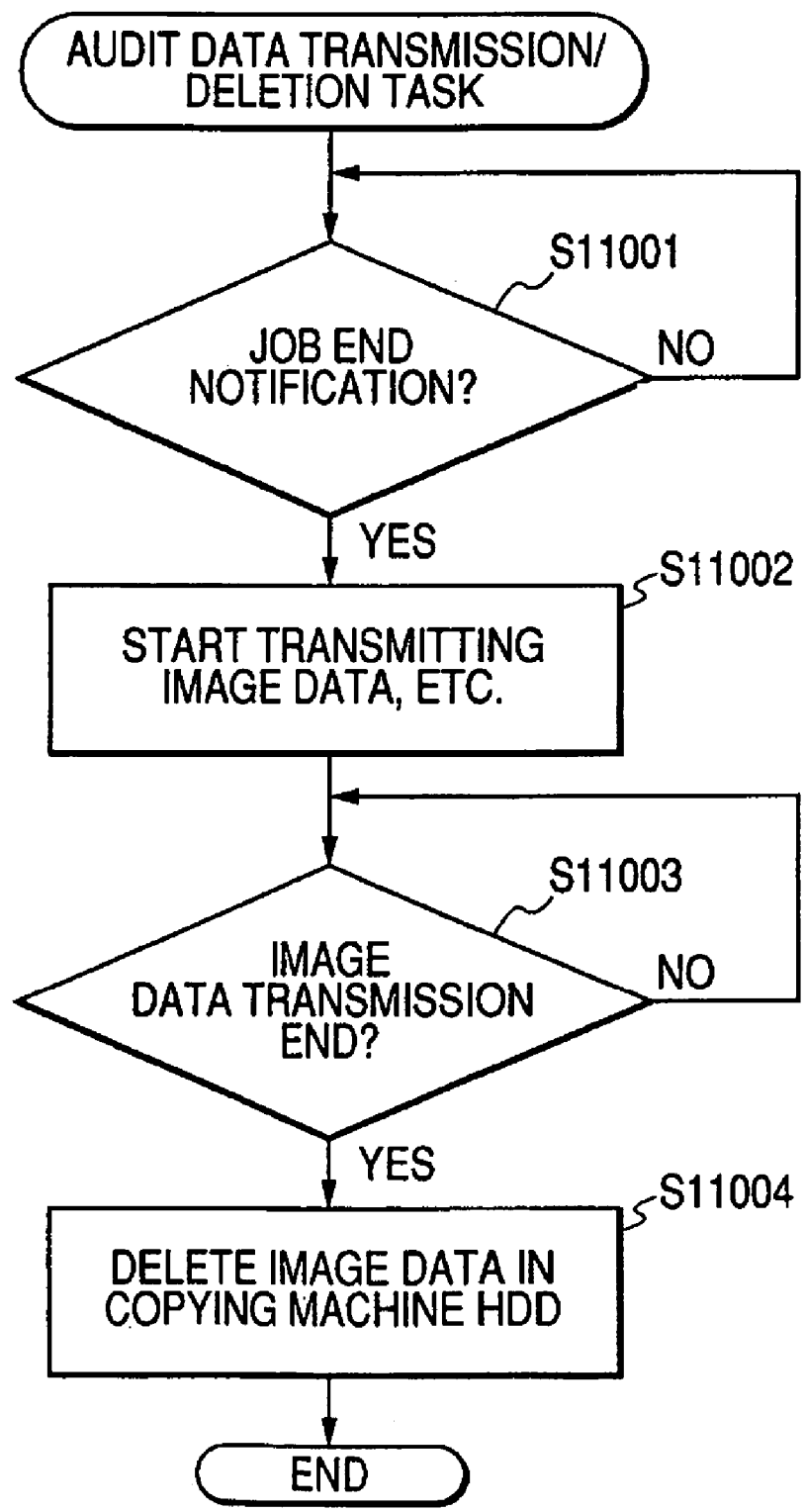
FIG. 11 is a flow chart for explaining an example of an image data transmission/deletion task in an audit agent.

FIG. 11 is the flow chart for explaining an example of the audit data transmission/deletion task to be executed in the audit agent 4001. Here, it should be noted that the audit data transmission/deletion task is executed on the premise that, although the audit data transfer instruction from the audit server 1100 has been received by the audit agent 4001, the audit data cannot be actually transferred because, for example, the job is executed by the copying machine 1001. In such a case, according to the audit data transmission/deletion task, the audit data transfer instruction is once stored, and then the audit data is actually transferred to the audit server 1100 if the job ends in the copying machine 1001.

Besides, the audit data transmission/deletion task acts in a case where the job start is notified on the way to transfer the audit data from the audit agent 4001 to the audit server 1100 or in a case where some kind or another error occurs in the copying machine 1001. Here, it should be noted that, in the latter case, the system administrator can set through the operation unit 2012 the image transmission condition according to the occurred error or the like. Hereinafter, the case where, although the audit server 1100 received the transfer instruction of the audit data or the like, the image data cannot be actually transferred because the job is being executed in the copying machine 1001 will be explained by way of example.

That is, it is first confirmed in a step S11001 whether or not the job end is notified. If the job end is notified, the flow advances to a step S11002 to start transmitting the audit data. Then, if it is confirmed in a step S11003 that the transmission of the audit data ends, the flow advances to a step S11004 to delete the audit data stored in the HDD 2004 of the copying machine 1001, and then the audit data transmission/deletion task ends. Incidentally, when the audit data is deleted in the step S11004, null data or random data may be overwritten once or plural times to the deletion-target region so that the residual data does not remain in the deletion-target region.

Moreover, if the data transfer is cancelled on the way to transfer the audit data, the audit agent 4001 stores the audit data which have been transferred at the time when the data transfer is cancelled. Then, after the job ends, the audit agent 4001 restarts transmitting the audit data which are not yet transferred at the time when the data transfer is cancelled.

The audit data acquisition task shown in FIG. 10 is to acquire the audit data in the HDD 2004 of the copying machine 1001 under the control of the audit server 1100. That is, this is "pull-type transfer" in the sight of the copying machine 1001. On the other hand, the audit data transfer/deletion task shown in FIG. 11 is to cause the audit agent 4001 to transmit or transfer the audit data in the HDD 2004. That is, this is "push-type transfer" in the sight of the copying machine 1001. Hereinafter, the pull-type transfer and the push-type transfer will be explained in detail.

According to the present embodiment, in the job archive system which is equipped with the audit server 1100 and the copying machine 1001, in the case where the image data is transferred between the audit server 1100 and the copying machine 1001, that is, in a case where the audit data (including the audit image data and the history record) stored in the copying machine 1001 is transferred or transmitted to the audit server 1100, the following two transfer modes to be separately used are provided between the audit server 1100 and the copying machine 1001.

First, the push-type transfer mode is cited. In the push-type transfer mode, the audit agent 4001 in the copying machine 1001 transfers the audit image data and the history record (together constituting the audit data) stored in the HDD 2004 to the audit server 1100 periodically, at predetermined timing or in response to the user's operation instruction on the copying machine 1001. Therefore, if the push-type transfer mode is used, it is possible to transmit the data in real time. Moreover, if the free capacity of the HDD 2004 is small, or if the more secure job is executed, it is preferable to use the push-type transfer mode.

Second, the pull-type transfer mode is cited. In the pull-type transfer mode, the audit server 1100 fetches the audit data in the digital copying machine 1001. Therefore, if the pull-type transfer mode is used, it is possible to manage the schedules of the image acquisition for the plural copying machines in a lump, that is, the audit server 1100 can wholly manage the schedule for acquiring the audit data. Therefore, it is possible to transfer the audit data in the nighttime while it does not bear a load on the network. Moreover, it is possible to disperse a load by shifting the transfer timing from each copying machine so as to prevent that the audit data are simultaneously transferred from the plural copying machines.

Then, the following operation is executed by maximally taking advantages of both the transfer modes.

(1) As long as the job is being executed on the side of the copying machine 1001, the pull operation (that is, the operation in the pull-type transfer mode) from the audit server 1100 to the copying machine 1001 is inhibited. Then, after the relevant job ends, the audit data is transmitted or transferred from the copying machine 1001 to the audit server 1100 in the push-type transfer mode.

(2) If the job is executed by the copying machine 1001 on the way to transmit the audit data in the pull-type transfer mode, the transfer of the audit data is once cancelled. Then, after the relevant job ends, the push operation (that is, the operation in the push-type transfer mode) is restarted with respect to the data at the time when the data transfer is cancelled.

(3) As long as the error occurs in the copying machine 1001 (mainly, as long as the error which disables to execute the image formation occurs), the push operation is executed.

Here, it should be noted that, as above, the operations (1) and (2) have been already explained in detail with reference to FIGS. 9 to 11.

As explained above, if the job or the like is executed on the side of the copying machine 1001, it is inhibited or limited to transfer the audit data (that is, the chasing image or the like) between the audit server 1100 and the copying machine 1001. Thus, it is possible to provide the system (including the copying machine and the server) capable of tracing by whom, when and where the image was formed, and it is also possible to prevent that the performance in case of executing the job or the like in the copying machine 1001 deteriorates.

Second Embodiment

Subsequently, the second embodiment of the present invention which relates to the print operation will be explained in detail. In the first embodiment, the original is read by the scanner 2070 to input the image data. On the other hand, in the present embodiment, the print data (including PDL data) is input from the client computer 1004. For this reason, since the present embodiment is different from the first embodiment only in the point of the image data input method, the same parts and the like as those described in the first embodiment are denoted by the corresponding same numerals and symbols as those shown in FIGS. 1 to 11, and the detailed explanation thereof will be omitted. Hereinafter, the characteristic portion of the present embodiment will be explained in detail.

It should be noted that, in the present embodiment, the basic system configuration diagram, the basic system block diagram, and the system configuration diagram in case of writing the image data and the history record are respectively the same as FIGS. 1, 2 and 3, whereby the details of these diagrams will be omitted.

Figure 12:
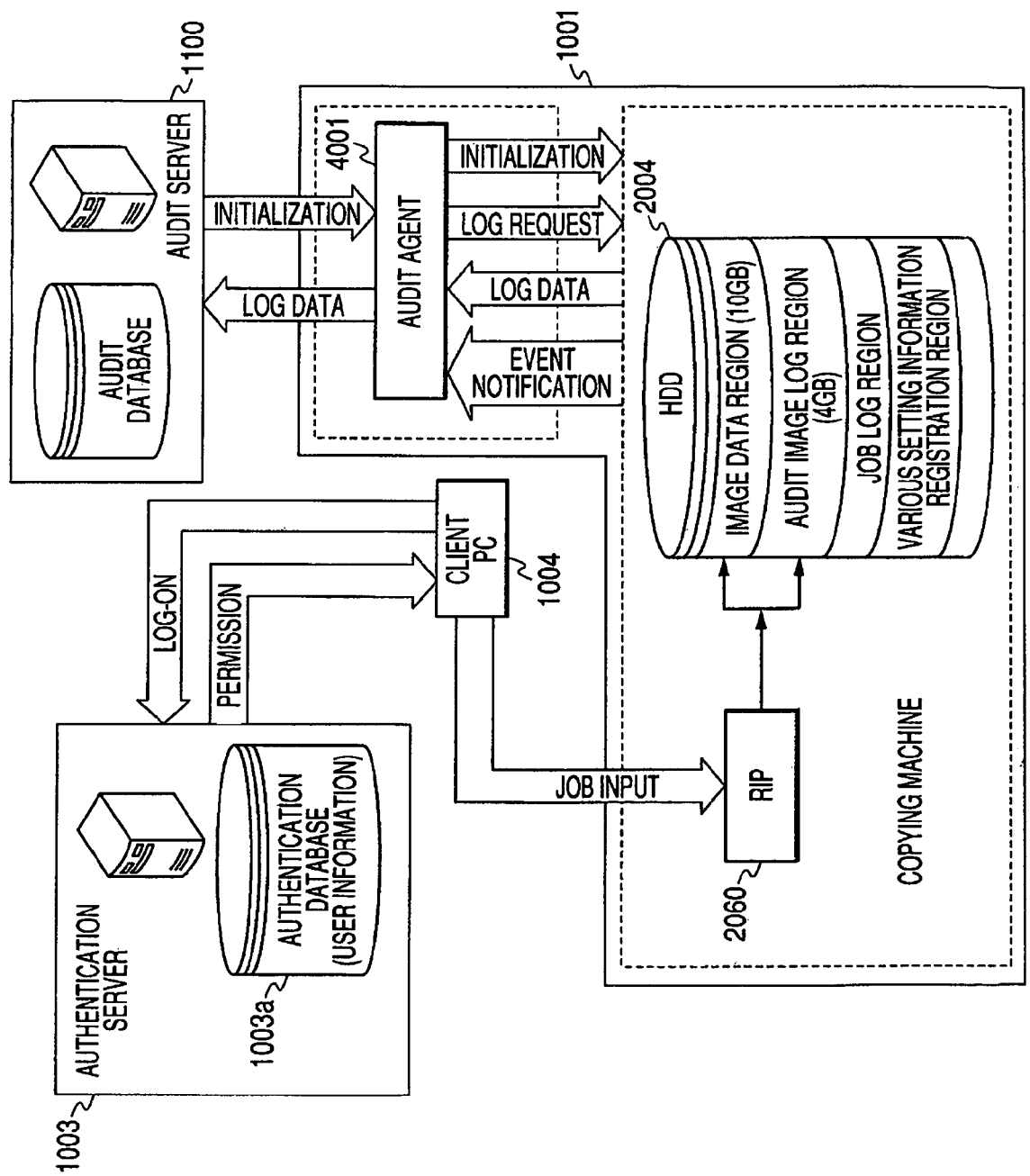
FIG. 12 is a diagram showing an example of the configuration of the image processing system in case of printing, according to the second embodiment of the present invention.

FIG. 12 is a diagram showing an example of the configuration of the image processing system in the print operation. In FIG. 12, a database/mail server 1003 which functions as an authentication server is equipped with an authentication database 1003*a* for storing the user information. Thus, the database/mail server 1003 controls log-on (success and failure), log-off and the like by checking the user name and the password input from an external device (that is, a client computer 1004) and the user information stored in the authentication database 1003*a*. Moreover, the database/mail server 1003 can execute new creation, change and deletion of the user of the authentication database 1003*a*. Here, since other constituent components in the image processing system are the same as those already explained with reference to FIG. 4, the explanation thereof will be omitted.

Figure 13:
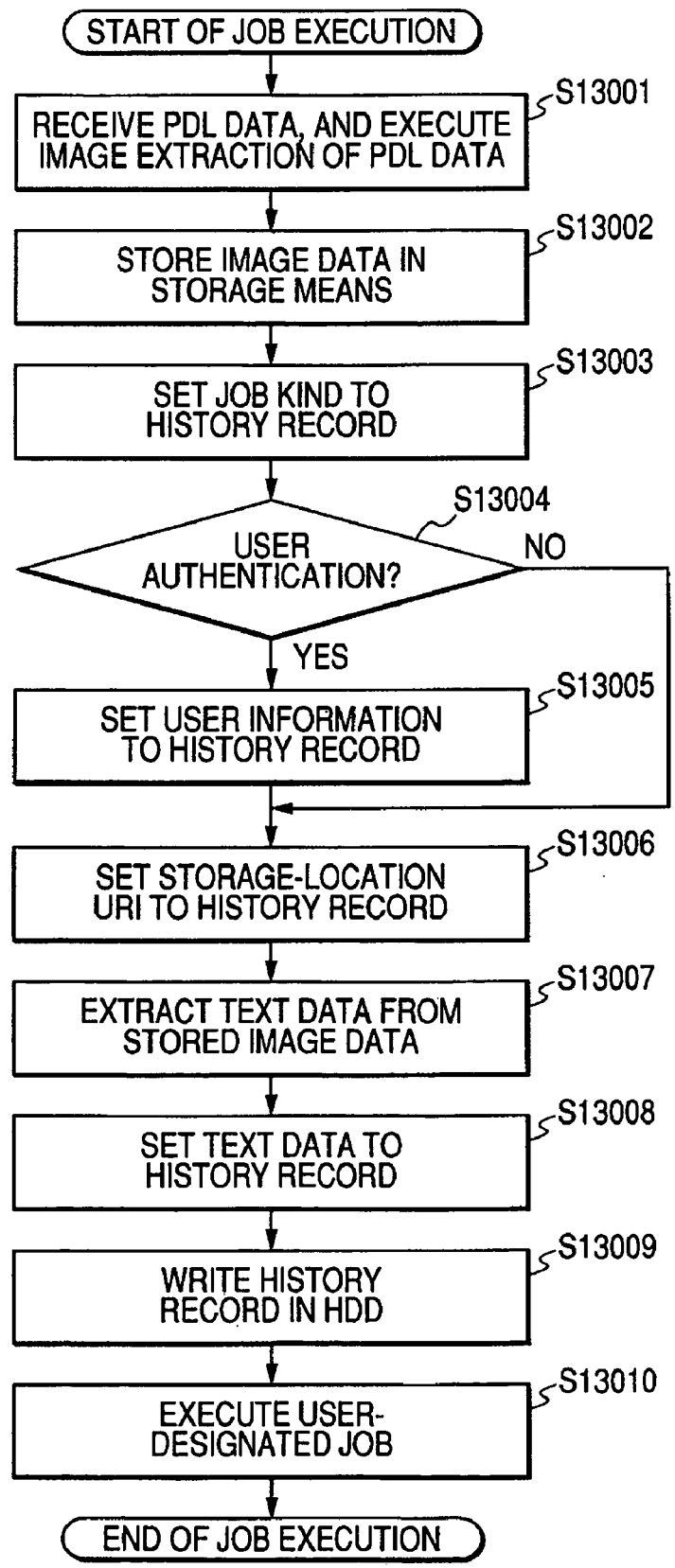
FIG. 13 is a flow chart showing an example of the process that image data input from a client computer is stored in an HDD, and its URI and text data included in the read image data are recorded in a history record, according to the second embodiment of the present invention.

FIG. 13 is a flow chart showing an example of the process of the copying machine 1001 that the image data based on the print data input from the client computer 1004 being the external device is stored in the HDD (that is, predetermined storage means) 2004, and its URI and the text data included in the image data are recorded in the history record.

First, the user instructs to start the job execution by handling the client computer 1004.

Subsequently, in a step S13001, the RIP 2060 receives the PDL data and extracts a PDL code included in the received data into a bitmap image. Then, in a step S13002, the generated image data are sequentially recorded in the audit image log region on the HDD 2004 with respect to each page. Here, the image data can be stored in the HDD 2004 so that each of the plural pages is stored as the individual file, or so that the plural pages are combined into one document and then stored as one file. Besides, the generated image data of the read original is also stored in the image data region of the HDD 2004 for primary job execution.

After the image data were stored in the HDD 2004 as above, the flow advances to a step S13003 to set, to the history record, the job kind of the job to be executed. Here, it should be noted that also the job kind in the present embodiment is the kind of functions such as a print function, a copy function, a facsimile function, a scanning function and the like. Here, since the present embodiment is premised on the print job of receiving the PDL data, "print" is selected as the kind of job.

Next, in a step S13004, it is judged whether or not the copying machine 1001 has been set to have the user authentication. If it is judged that the copying machine 1001 has been set to have the user authentication, the flow advances to a step S13005 to set the user information such as a user name, a user ID and the like to the history record, and then the flow advances to a step S13006. Meanwhile, if it is judged in the step S13004 that the copying machine 1001 has been set not to have the user authentication, the flow skips the step S13005 and directly advances to the step S13006.

Subsequently, in the step S13006, the URI indicating the storage location of the image data stored or recorded in the step S13002 to the HDD 2004 is set to the history record. Then, in a step S13007, the text data is extracted from the image data recorded in the HDD 2004. Here, it should be noted that the extracting of the text data in the step S13007 is the same as the extraction of the text data in the step S6007 of FIG. 6 which is executed to the original image through the OCR process. More specifically, it is possible to execute the OCR process after extracting the PDL data into the bitmap image. Alternatively, it is possible to hold the PDL data even after extracting the PDL data into the bitmap image, and extract the character code in the text portion from the PDL data. Incidentally, as well as the step S6007 of FIG. 6, it is possible to skip the process in the step S13007 so as to cause the audit server 1100 to extract the text data.

Then, the text data extracted in the step S13007 is set to the history record in a step S13008, and the history record is written into the HDD 2004 in a step S13009. After the history record was recorded in the HDD 2004 as above, the flow advances to a step S13010 to execute the job designated by the user before the process in the step S13001 is executed. Thus, the job execution normally ends.

By constituting as above, it is possible to attain the same effects as those in the first embodiment.

Third Embodiment

Subsequently, the third embodiment of the present invention will be explained in detail. In the third embodiment, the same parts as those described in the first and second embodiments are denoted by the corresponding same numerals and symbols as those shown in FIGS. 1 to 13, and the detailed explanation thereof will be omitted.

According to the present embodiment, in the same system as that shown in the first or second embodiment, in a case where the audit data (chasing image data or the like) stored in the HDD 2004 of the digital copying machine 1001 is transferred to the audit server 1100 in the pull-type transfer mode, it is inhibited to transfer the audit data from the audit server 1100 while the job is being executed in the digital copying machine 1001. Then, if such a transfer operation is inhibited, the transfer of the audit data stored in the HDD 2004 is executed in a lump at the time of the next transfer scheduled by the audit server 1100.

Thus, in addition to the effects attained in the first and second embodiments, it is further possible to attain the effect that the transfer of the audit data to the plural copying machines can be managed in a lump. Moreover, it is possible to attain the effect that it is unnecessary to provide the audit agent 4001 explained in the first and second embodiments, whereby it is possible to reduce man-hour for development and evaluation.

Fourth Embodiment

Subsequently, the fourth embodiment of the present invention will be explained in detail. In the fourth embodiment, the same parts as those described in the first to third embodiments are denoted by the corresponding same numerals and symbols as those shown in FIGS. 1 to 13, and the detailed explanation thereof will be omitted.

According to the present embodiment, in the same system as that shown in the first or second embodiment, while an error is occurring in the digital copying machine 1001 (mainly it is impossible to form an image), or when the free capacity of the audit image log region in the HDD 2004 of the copying machine 1001 comes to be small, the audit agent 4001 installed in the copying machine 1001 transfers the audit data stored in the HDD 2004 to the audit server 1100 (that is, the audit data is transmitted in the push-type transfer mode). For example, the capacity of 4 GB is secured as the audit image log region in the HDD 2004. In the circumstance, when the free capacity of the audit image log region comes to be equal to or smaller than a predetermined amount (for example, the free capacity comes to be equal to or smaller than 10%), the audit data is transmitted in the push-type transfer mode. Alternatively, when the free capacity of any one of the audit image log region and the job log region on the HDD 2004 comes to be equal to or smaller than the predetermined amount, the audit data may be transmitted in the push-type transfer mode. In these cases, it is possible to adopt the monitoring means that the audit agent 4001 monitors the free region. Alternatively, it is possible to adopt the monitoring means that another module in the copying machine 1001 always monitors the free region, and, when the free capacity of the audit image log region comes to be equal to or smaller than the predetermined amount, the relevant module notifies the audit agent 4001 of such a fact. Incidentally, it should be noted that "predetermined amount" of the free amounts in the audit image log region and the job log region can be set to the copying machine 1001 and then changed by the administrator.

Thus, it is possible to more emphasize the advantage attained in case of transmitting the audit data in the push-type transfer mode, that is, it is possible to transmit the audit data in real time. Moreover, it is possible to prevent that the performance in case of executing the job in the copying machine 1001 deteriorates. Besides, since the audit data can be transmitted or transferred in the push-type transfer mode before the audit image log region becomes full of data, it is possible to prevent that the job cannot be executed because the free capacity of the audit image log region comes to be zero, and it is also possible to prevent that the recorded audit data overflows.

Ordinarily, the audit server 1100 acquires the audit data of the HDD 2004 in the pull-type transfer mode on the basis of the schedule. Then, before the audit server 1100 acquires the audit data next time, the copying machine 1001 transmits or transfers the audit data to the audit server 1100 in the push-type transfer mode if the free capacity of the audit image log region or the job log region comes to be equal to or smaller than the predetermined amount. Thus, it is possible to optimally use the push-type transmission and the pull-type transmission discriminatingly.

Moreover, the transmission schedule of the audit data has been set to the audit agent 4001, whereby the audit agent 4001 transmits or transfers the audit data of the HDD 2004 based on the transmission schedule. Then, before the audit agent 4001 transmits the audit data next time, the copying machine 1001 transmits or transfer the audit data to the audit server 1100 in the push-type transfer mode if the free capacity of the audit image log region or the job log region comes to be equal to or smaller than the predetermined amount. Thus, even if only the push-type transfer mode is used, it is possible attain the same effect as that of using the push-type transmission and the pull-type transmission discriminatingly.

Other Embodiments

In order to operate various devices so as to achieve the functions of the above embodiments, the present invention also includes a case of supplying program codes of software for achieving the functions of the above embodiments to the computer in the device or the system connected to these devices, and of causing the computer (CPU or MPU) in the system or the apparatus to operate these devices according to the supplied and stored program codes so as to achieve the functions of the above embodiments.

In this case, the program codes themselves of software achieve the functions of the above embodiments. Therefore, the program codes themselves, and the means for supplying the program codes to the computer, for example, the storage medium storing these program codes, constitute the present invention. As the storage medium of storing the program codes, for example, a flexible disk, a hard disk, an optical disk, a magnetooptical disk, a CD-ROM, a magnetic tape, a nonvolatile memory card, a ROM or the like can be used.

Further, it can be obviously understood that the present invention includes not only a case where the functions of the above embodiments are achieved by executing the program codes with the computer, but also a case where the program codes cooperate with an OS (operating system) or another application software running on the computer and thus the functions of the above embodiments are achieved.

Furthermore, it can be obviously understood that the present invention also includes a case where, after the supplied program codes are stored into the memory of the function expansion board inserted in the computer or the function expansion unit connected to the computer, the CPU or the like provided in the function expansion board or the function expansion unit executes a part or all of the actual processes based on the instructions of the program codes, and thus the functions of the above embodiments are achieved.

As explained above, according to the present invention, it is possible to reduce the loads to the network and the audit server in case of transferring the audit data for job archive. Moreover, it is set not to redundantly execute the job execution in the image formation device and the image data transfer from the image formation device to the server device, whereby it is possible to prevent as much as possible that the performance in case of executing the job by the image formation device deteriorates.

As above, although the present invention has been fully explained with reference to the preferred embodiments, the present invention is not limited to the above embodiments. That is, many apparently widely different embodiments of the present invention can be made without departing from the spirit and scope thereof.

This application claims priority from Japanese Patent Application No. 2005-029656 filed on Feb. 4, 2005, which is hereby incorporated by reference herein.

What is claimed is:

1. An image processing system which is configured by providing an image processing device for executing an image process to image data and a server device,
    wherein said image processing device comprises:
    a storage unit adapted to store audit data including the image data and history information that indicates a history of an execution of the image process to the image data,
    a transfer unit adapted to transfer the audit data stored in said storage unit to said server device, and
    a first control unit adapted to provide control, in a case where the image process is not executed by said image processing device, to enable said transfer unit to transfer the audit data stored in said storage unit to said server device irrespective of a request by said server device, and
    wherein said server device comprises:
    a request unit adapted to request the audit data stored in said storage unit of said image processing device,
    an acquisition unit adapted to acquire the audit data transferred by said transfer unit,
    an audit data storage unit adapted to store the audit data acquired by said acquisition unit, and
    a second control unit adapted to provide control, in a case where another execution of the image process is started by said image processing device while the audit data stored in said storage unit is being transferred to said server device by said transfer unit in response to the request by said request unit, to temporarily stop the transfer of the audit data by said transfer unit and restart the transfer of the audit data after the another execution of the image process is completed by said image processing device.

2. An image processing system according to claim 1, further comprising a text data extraction unit adapted to extract text data from the image data stored in said storage unit or the image data stored in said audit data storage unit,
    wherein said audit data storage unit additionally stores storage location information of the image data and the text data extracted from the image data to the history information.

3. An image processing system according to claim 1, wherein said image processing device further comprises
    a free capacity judgment unit adapted to judge a free capacity of said storage unit, and
    wherein said transmission unit transfers the image data stored in said storage unit to said server device according to a judged result by said free capacity judgment unit.

4. An image processing system according to claim 1, wherein said server device further comprises a schedule management unit adapted to manage a schedule by which said transfer unit starts a transfer operation, and
    wherein said transfer unit transfers the image data stored in said storage unit, based on the schedule managed by said schedule management unit.

5. An image processing system according to claim 1, wherein
    said image processing device further comprises an original reading unit adapted to read an original image and thus generate image data, and
    said storage unit stores the image data read by said original reading unit.

6. An image processing system according to claim 1, wherein said image processing device further comprises a user authentication unit adapted to authenticate a user before the image process is executed by said image processing device, and
    wherein said storage unit stores information for specifying the user authenticated by said user authentication unit, a date and a time when the history information concerning the image process was generated, and a setting for the image process, as the history information.

7. An image processing system according to claim 1, wherein
    said image processing device further comprises a reception unit adapted to receive print data from an external device, and
    said storage unit stores the image data generated based on the print data received by said reception unit.

8. An image processing system according to claim 1, wherein said storage unit stores execution result information generated after the execution of the image process to the input image data is completed, in addition to the history information generated in association with the image process to the input image data.

9. An audit data transfer method of transferring audit data from an image processing device for executing an image process to image data to a server device, said method comprising:
    a storage step of storing, in a storage unit of the image processing device, the audit data including the image data and history information that indicates a history of an execution of the image process to the image data;
    a transfer step of transferring the audit data stored in said storage step from the image processing device to the server device;
    a request step of requesting the audit data stored in said storage step from the server device to the image processing device;
    an acquisition step of acquiring the audit data transferred in said transfer step, by the server device;
    an audit data storage step of storing the audit data acquired in said acquisition step, in an audit data storage unit of the server device;
    a first control step of controlling, in a case where the image process is not executed by the image processing device, to allow said transfer step to transfer the audit data stored in the storage unit to the server device irrespective of the request in said request step; and
    a second control step of controlling, in a case where another execution of the image process is started by the image processing device while the audit data stored in the storage unit is being transferred to the server device in said transfer step in response to the request in said request step, to temporarily stop the transfer of the audit data in said transfer step and restart the transfer of the audit data after the another execution of the image process is completed by the image processing device.

* * * * *